US009140779B2

(12) United States Patent
Smits et al.

(10) Patent No.: US 9,140,779 B2
(45) Date of Patent: Sep. 22, 2015

(54) METHOD OF COMPENSATING SUB-ARRAY OR ELEMENT FAILURE IN A PHASED ARRAY RADAR SYSTEM, A PHASED ARRAY RADAR SYSTEM AND A COMPUTER PROGRAM PRODUCT

(75) Inventors: Felix Maria Antonius Smits, The Hague (NL); Adriaan Jan De Jong, The Hague (NL); Wilhelmus Lambertus Van Rossum, The Hague (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 266 days.

(21) Appl. No.: 13/581,893

(22) PCT Filed: Mar. 8, 2011

(86) PCT No.: PCT/NL2011/050161
§ 371 (c)(1),
(2), (4) Date: Oct. 17, 2012

(87) PCT Pub. No.: WO2011/112083
PCT Pub. Date: Sep. 15, 2011

(65) Prior Publication Data
US 2013/0113652 A1 May 9, 2013

(30) Foreign Application Priority Data

Mar. 8, 2010 (EP) .................................... 10155774
Dec. 1, 2010 (EP) .................................... 10193360

(51) Int. Cl.
*H01Q 3/00* (2006.01)
*G01S 7/40* (2006.01)
(Continued)

(52) U.S. Cl.
CPC .................. *G01S 7/40* (2013.01); *G01S 7/4004* (2013.01); *G01S 13/42* (2013.01); *H01Q 3/26* (2013.01); *H01Q 3/267* (2013.01)

(58) Field of Classification Search
CPC ..... H01Q 3/267; H01Q 21/0025; H01Q 3/26; G01S 7/2813; G01S 7/40; G01S 7/4004
USPC .......................... 342/173, 174, 368, 371, 372
See application file for complete search history.

(56) References Cited

U.S. PATENT DOCUMENTS 4,359,740 A * 11/1982 Frazita .......................... 343/703
5,083,131 A * 1/1992 Julian ........................... 342/372

(Continued)

FOREIGN PATENT DOCUMENTS

WO 2007/082335 A1 7/2007

OTHER PUBLICATIONS

International Search Report—PCT/NL2011/050161—Mailing date: May 25, 2011.

(Continued)

*Primary Examiner* — John B Sotomayor
*Assistant Examiner* — Marcus Windrich
(74) *Attorney, Agent, or Firm* — Banner & Witcoff, Ltd.

(57) ABSTRACT

The invention relates to a method of compensating sub-array or element failure in a phased array radar system. The method comprises the step of defining a virtual array comprising a multiple number of virtual transceiver tiles preferably arranged halfway all connection lines interconnecting a transmitter tile to a receiver tile. Further, the method comprises the steps of performing phased array radar measurements, and estimating radar data associated with a first transmitter/receiver combination by using radar data associated with a second transmitter/receiver combination, wherein the virtual transceiver tile of the first transmitter/receiver combination substantially coincides with the virtual transceiver tile of the second transmitter/receiver combination.

15 Claims, 12 Drawing Sheets

(51) Int. Cl.
G01S 13/42 (2006.01)
H01Q 3/26 (2006.01)

(56) References Cited

U.S. PATENT DOCUMENTS

| | | | | |
|---|---|---|---|---|
| 5,416,489 | A | 5/1995 | Mailloux | |
| 6,140,976 | A * | 10/2000 | Locke et al. | 343/853 |
| 6,339,398 | B1 * | 1/2002 | Redvik et al. | 342/372 |
| 6,573,862 | B2 * | 6/2003 | Vail et al. | 342/368 |
| 7,864,110 | B2 * | 1/2011 | Kemkemian et al. | 342/372 |
| 8,049,661 | B1 * | 11/2011 | Loberger | 342/173 |
| 8,354,960 | B2 * | 1/2013 | Krich et al. | 342/379 |
| 2008/0180323 | A1 * | 7/2008 | Kemkemian et al. | 342/372 |
| 2009/0201205 | A1 * | 8/2009 | Catreux-Erceg et al. | 342/372 |
| 2009/0303125 | A1 | 12/2009 | Caille et al. | |
| 2010/0295730 | A1 * | 11/2010 | Jeon | 342/372 |

OTHER PUBLICATIONS

Fishler E et al: "Mimo radar: an idea whose time has come", Radar Conference, 2004. Proceedings of the IEEE Philadelphia, PA, USA April 26-29, 2004, Piscataway, NJ, USA,IEEE, Apr. 26, 2004, pp. 71-78, XP010711534, DOI: DOI:10.1109/NRC.2004.1316398, ISBN: 978-0-7803-8234-3.

"Introduction to Radar Systems" by Merrill I. Skolnik; International Edition 2001 McGraw-Hill International Editions; Chapter 2.1; ISBN 007-118189-X.

"An Introduction to Radio Astronomy" by Bernard F. Burke and F. Graham-Smith; Third Edition 2010 Cambridge University Press; p. 8; ISBN 978-0-521-87808-1.

"Radar Remote Sensing and Surface Scattering and Emission Theory" by Fawwaz T. Ulaby, Richard K. Moore, Adrian K. Fung; Microwave Remote Sensing Active and Passive, vol. II, 1982; ISBN 0-201-10760-0 (v.2), Chapter 7, p. 457.

* cited by examiner

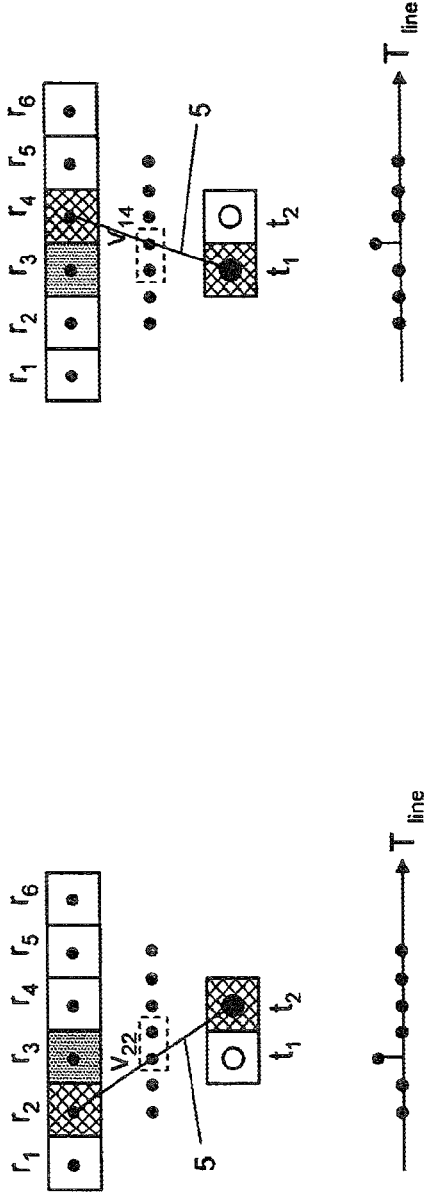

METHOD OF COMPENSATING SUB-ARRAY OR ELEMENT FAILURE IN A PHASED ARRAY RADAR SYSTEM, A PHASED ARRAY RADAR SYSTEM AND A COMPUTER PROGRAM PRODUCT

CROSS-REFERENCE TO RELATED APPLICATIONS

This application is a U.S. National Stage application under 35 U.S.C. §371 of International Application PCT/NL2011/050161 (published as WO 2011/112083 A1), filed Mar. 8, 2011, which claims priority to Application EP 10155774.2, filed Mar. 8, 2010 and Application EP 10193360.4, filed Dec. 1, 2010. Benefit of the filing date of each of these prior applications is hereby claimed. Each of these prior applications is hereby incorporated by reference in its entirety.

FIELD OF THE INVENTION

The invention relates to a method of compensating sub-array or element failure in a phased array radar system, comprising the steps of providing a transmitter array comprising a multiple number of substantially identical transmitter tiles, providing a receiver array comprising a multiple number of substantially identical receiving tiles, and performing phased array radar measurements.

BACKGROUND OF THE INVENTION

Radar systems are known for transmitting and/or receiving radar signals in preferred directions using a transmission antenna and a separate receiver antenna or a single antenna that is used for both transmission and receipt. Phased array radar antennas include a multiple number of antenna elements that often are arranged in regular patterns and are connected to transmitter and/or receiver modules. For practical purposes, series of antenna elements and transceiver modules are often grouped into sub-arrays which are stacked to form a complete phased array. It is noted that in this context, both sub-arrays and array elements are denoted by tiles.

When a single transmitter tile and/or a single receiver tile does not operate properly, e.g. due to a defect, the resulting transmission antenna pattern and/or receiver antenna pattern deteriorates, thereby significantly increasing the radar system angular sensitivity to clutter and jammer signals. The performance of the radar system becomes worse thereby rendering a process of obtaining reliable radar observations more difficult.

In prior art systems, it is proposed to use only the largest part of the phased array that still operates. However, the radar system is then not used efficiently in terms of radar gain and power. Further, signals of failing elements can be estimated using data associated with neighbouring elements. Such a system is, however, not applicable when an entire sub-array fails. Alternatively, the defect transmitter tile or receiver tile can be replaced. However, this is time consuming and not always possible in an operational situation. The radar system is then temporarily unavailable.

SUMMARY OF THE INVENTION

It is an object of the invention to provide a method according to the preamble of compensating sub-array or element failure in a phased array radar system wherein at least one of the disadvantages identified above is reduced or avoided. More specifically, the invention aims at obtaining a method wherein the angular radar sensitivity pattern performance of the radar system can be maintained at substantially the same level after the occurrence of a single transmitter tile or single receiver tile failure. Thereto, the method according to the invention further comprises the steps of defining a virtual array comprising a multiple number of virtual transceiver tiles each virtual transceiver corresponding to a particular transmitter tile and a particular receiver tile such that the propagation time of a radar wave transmitted by the transmitter tile and received by the receiver tile, via a radar object, substantially equals the propagation time of a radar wave transmitted and received by the virtual transceiver tile, via the radar object, and estimating radar data associated with a first transmitter/receiver combination by using radar data associated with a second transmitter/receiver combination, wherein the virtual transceiver tile of the first transmitter/receiver combination substantially coincides with the virtual transceiver tile of the second transmitter/receiver combination.

By defining the virtual transceiver tiles array and by using radar data associated with a particular transmitter/receiver combination for estimating radar data associated with another transmitter/receiver combination having the virtual transceiver tile in common, it appears that a very good approximation of radar data can be obtained. Therefore, missing radar data, e.g. caused by a malfunctioning transmitter tile or receiver tile can be compensated. The reconstructed radar data leads to an angular radar sensitivity pattern that has a comparable quality compared to an original antenna pattern based on real radar data obtained from all transmitter and receiver tiles.

Advantageously, the operation of the phased array radar system can be continued since the act of replacing a defect transmitter module or receiver module can be postponed or even omitted.

The method according to the invention can be applied to sub-arrays as well as to single elements.

It appears that the sensitivity of the phased array radar system is reduced only by $1/N \times 100\%$ (one part in N) if a single tile failure occurs, wherein N is the total number of tiles.

As an example, when a particular receiver and/or a particular transmitter tile is defect, radar data associated with transmitter/receiver combinations related to the single transmitter and/or single receiver can be estimated using radar data associated with coinciding virtual transceiver tiles. Here, for each missing transmitter/receiver combination, data can be used associated with another transmitter/receiver combination having a virtual transceiver tile position in common with the virtual transceiver tile position corresponding to the missing transmitter/receiver combination. Hence, the method may identifying other transmitter/receiver combinations having their virtual transceiver tiles in common with the virtual transceiver tiles corresponding with the transmitter/receiver combinations associated with radar data to be estimated. A corrected radar response can be obtained by adding a missing response due to the particular receiver and/or transmitter tile to the total radar response that is obtained with the failing receiver/transmitter tile.

Optionally, also radar data can be estimated when a multiple number of receivers and/or transmitters are defect.

In a specific embodiment, an additional measurement is performed for each identified transmitter/receiver tile response. In a second, more efficient embodiment, the method according to an aspect of the invention includes a step of combining data measurements associated with the identified transmitter/receiver combinations having their virtual transceiver tiles in common with the virtual transceiver tiles corresponding with the transmitter/receiver combinations associated with radar data to be estimated.

According to a further aspect of the invention, the method may include the step of simultaneously transmitting, at the transmitter tiles, a sequence of radar signals that are mutually orthogonal or linearly independent in the aperture domain, a step of receiving radar data at receiver tiles, a step of determining radar data associated with a single or a combination of particular transmitter tiles and a single or a combination of particular receiver tiles, from a sequence of radar data received at the particular receiver tile by using the orthogonality or the linear independence of the transmitted radar signals, and a step of determining also radar data associated with the identified transmitter/receiver combination by using the orthogonality or linear independence of the transmitted radar signal. By transmitting a sequence of coded signals and using all transmitters for each transmission, and exploiting the aperture coding of the signals for reconstruction, the transmitter gain and the receiver gain of the radar system is used efficiently, and less radar transmissions and data acquisition steps are required compared with the above-mentioned first embodiment, but multiple beams must be formed from the signals of a receive sub-array.

In a relatively simple embodiment, an aperture coded sequence of radar signals is emitted sequentially. However, if a separate receiver and transmitter is installed for each emission, and if the emissions are orthogonal in another domain than the aperture domain, e.g. in the time-frequency domain or polarisation domain, the aperture coded sequence of emissions can be transmitted and received simultaneously.

In a specific embodiment according to the invention, the method includes the steps of:
  determining a sequence of aperture codes of transmission signals that will allow reconstruction of missing virtual transceiver signals;
  determining beams and corresponding tapering weights of these beams for forming a reconstruction of missing virtual transceiver signals;
  transmitting the aperture coded sequence of radar signals;
  receiving a sequence of reflected signals at each tile with the predetermined beams and beam weights;
  reconstructing a total signal of missing virtual transceivers from the sequence of received aperture coded signals by exploiting the coding properties; and
  adding the reconstructed total missing signal to an uncorrected radar signal.

The coding properties may include orthogonality or linear independence, e.g. when using a time division multiplex transform, a frequency division multiplex transform and/or a code division multiplex transform.

Further, the invention relates to a phased array radar system.

Additionally, the invention relates to a computer program product. A computer program product may comprise a set of computer executable instructions stored on a data carrier, such as a CD, a DVD or a solid state memory, e.g. a USB or a SSD (solid state drive). The set of computer executable instructions, which allow a programmable computer to carry out the method as defined above, may also be available for downloading from a remote server, for example via the Internet.

Other advantageous embodiments according to the invention are described in the following claims.

BRIEF DESCRIPTION OF THE DRAWINGS

By way of example only, embodiments of the present invention will now be described with reference to the accompanying figures in which
FIG. 2a shows a schematic view of the phased array radar system of FIG. 1a in a first specific acquisition step;
FIG. 2b shows a schematic view of the phased array radar system of FIG. 1a in a second specific acquisition step.

The figures are merely schematic views of preferred embodiments according to the invention. In the figures, the same reference numbers refer to equal or corresponding parts.

DETAILED DESCRIPTION OF THE INVENTION

Figure 1B:
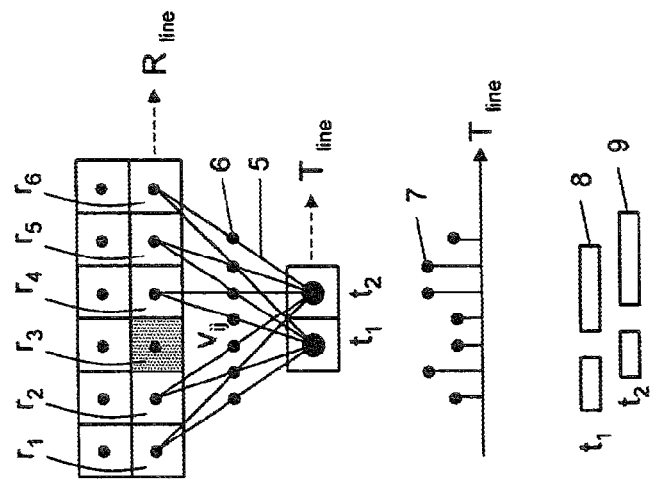
FIG. 1b shows a schematic view of the phased array radar system of FIG. 1a in a state wherein a receiver module is defect.
Figure 1A:
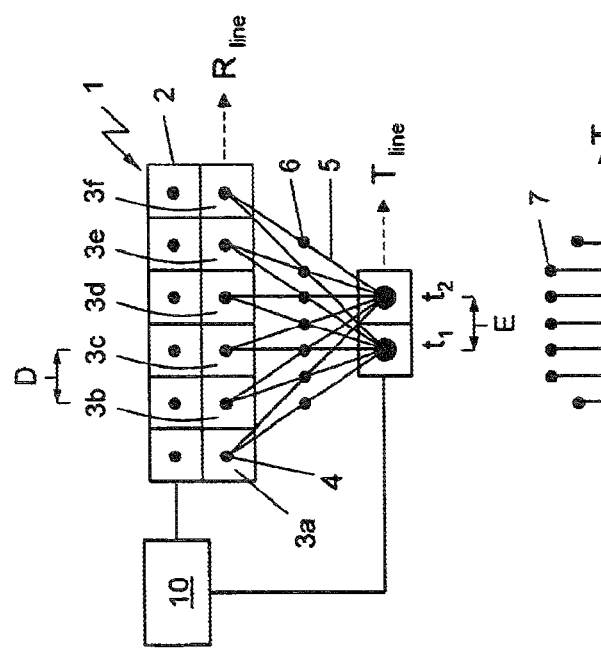
FIG. 1a shows a schematic view of a first phased array radar system according to the invention in a perfect state.

FIG. 1a shows a schematic view of a first phased array radar system 1 according to the invention. Here, the system 1 is in a perfect state, i.e. the transmitter tiles $t_1$, $t_2$ and the receiver tiles 3a-f, comprised by the system, operate regularly. There is no defect in the tiles, also called modules. The tiles or modules may include a single or a multiple number of array elements.

The transmitter modules $t_1$, $t_2$ are arranged at equidistant positions on a linear transmitting line $T_{line}$, forming a transmitter array. Similarly, a first set of receiver modules 3a-f are also arranged at equidistant positions on a linear receiving line, forming a receiver array. A second set of receiver modules is arranged next and parallel to the first set of receiver modules. The distance D between adjacent receiving modules 3 substantially equals the distance E between adjacent transmitting modules t. The receiving module distance is defined at the distance between the center points 4 of the corresponding modules. A similar definition applies to the distance between transmitting modules. Further, the transmitting line $T_{line}$ and the receiving line $R_{line}$ are substantially parallel.

FIG. 1a further shows connection lines 5 interconnecting all pairs of transmitter modules t and receiver modules 3.

Halfway each connection line 5 a virtual transceiver module 6 is defined interrelating the respective transmitter module t and receiver module 3. The system 1 further comprises a processor 10 connected to the transmitter array and the receiver array.

During use of the system 1, phased array radar measurements are performed leading to a number of samples. In the lower part of FIG. 1a the samples are represented as dots 7 arranged along the transmission line $T_{line}$ in relation to the corresponding virtual transceiver modules 6, thus expressing the multiple input multiple output (MIMO) structure of the transmitter/receiver geometry of the phased array radar system 1. A first bar 8 indicates samples generated by a first transmitter module $t_1$, while a second bar 9 indicates samples generated by a second transmitter module $t_2$. As can be seen, there is an overlap in virtual transceiver modules 6, i.e. a particular virtual transceiver module 6 (not at end sections of the virtual array) corresponds to two pairs of transmitter/receiver.

According to an aspect of the invention, the processor is arranged for estimating radar data that are missed if a transmitter and/or receiver module fails and/or when a radar measurement associated with a transmitter/receiver combination is not available. In particular, radar measurements associated with a particular transmitter tile and/or a particular receiver tile may not be available. The estimated radar data are based on data associated with transmitter/receiver pairs that have a virtual transceiver module in common with a pair including the failing transmitter and/or receiver module.

FIG. 1b shows a schematic view of the phased array radar system 1 in a state wherein a receiver module $r_3$ defect. The other receiver modules $r_1$, $r_2$, $r_4$-$r_6$ operate regularly. The first bar 8 and the second bar 9 include a gap. In order to reconstruct the missing radar data at the defect receiver module $r_3$, the virtual element signals $v_{ij}$ are defined as a signal directly related to a signal generated by a transmitter module i and received by a receiver module j.

FIG. 2a shows a schematic view of the phased array radar system 1 during a first specific acquisition step. Here, an additional data acquisition step is performed in order to estimate radar data generated by the first transmitter module $t_1$ that would be received by the defect third receiver $r_3$. This is accomplished by acquiring data associated with the virtual transceiver module $v_{22}$.

FIG. 2b shows a schematic view of the phased array radar system 1 during a second specific acquisition step, wherein a further additional data acquisition step if performed in order to estimate radar data generated by the second transmitter module $t_2$ that would be received by the defect third receiver $r_3$. This is accomplished by acquiring data associated with the data of the virtual transceiver module $v_{14}$.

Since the virtual transceiver modules $v_{22}$ and $v_{14}$ also relate to radar data of the missing pairs $t_1/r_3$ and $t_1/r_3$, respectively, the missing data can be estimated relatively accurately, thereby effectively compensating the missing data. Here, two pairs of transmitter/receiver are identified that have a common virtual transceiver module with two respective pairs of transmitter/receiver that are missing in the data. In the estimating step the obtained additional data is weighted properly to reconstruct the original missing beam data.

In general, measurement data associated with a transmitter i and a receiver j can be reconstructed using measurement data associated with a transmitter i−k and a receiver i+k, wherein the symbols i, j and k denote integers indicating a particular transmitter/receiver in the respective array. It can be shown that the first and second measurement data have the same corresponding virtual array in common.

Figure 3:
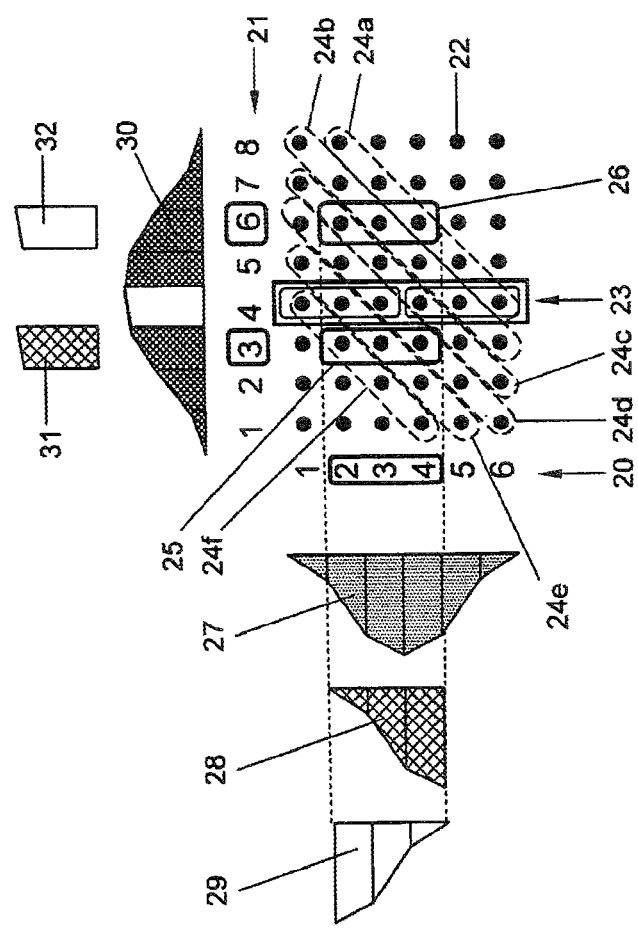
FIG. 3 shows a first schematic representation of measurements performed by a phased array radar system according to the invention.

FIG. 3 shows a first schematic representation of measurements performed by a phased array radar system 1 according to the invention. Here, six transmitter modules are arranged in parallel to six receiver modules, and the offset between subsequent modules is identical. The transmitter modules are symbolically indicated in the vertical column 20, while the receiver modules are symbolically indicated in the horizontal row 21. The matrix dots 22 represent specific radar measurements relating to the corresponding transmitter module and receiver module.

As an example, the fourth receiver module fails. Then, the measurements in the fourth column 23 are not available. In principle, measurements related to diagonal traces 24a-f can be used to construct the missing data. In a specific implementation, the six measurement data are found by using measurement data in a first block of data 25 wherein the third receiver module receives measurements from the second, third and fourth transmitter module, and by using measurement data in a second block of data 26 wherein the sixth receiver module receives measurements from the second, third and fourth transmitter module.

In general, a step has to be performed of identifying other transmitter/receiver combinations having their virtual transceiver tiles in common with the virtual transceiver tiles corresponding with the transmitter/receiver combinations associated with radar data to be estimated.

In order to actually perform the estimation of the missing measurements, a step of performed wherein at least one additional measurement is generated to obtain radar data associated with the identified other transmitter/receiver combinations.

In the situation as shown in FIG. 3, two additional measurement steps, repair transmissions, have to be performed, a first measurement received by the third receiver module and a second measurement received by the sixth receiver module.

FIG. 3 further shows a transmitter taper function 27 that is applied for performing the regular measurement. By applying the transmitter taper function a desired phased array antenna pattern is obtained. Similarly, a receiver taper function 30 is shown. During the first and the second addition measurement step, different transmitter taper functions 28, 29 are applied, as well as different receiver taper functions 31, 32, in order to compensate for the regular taper functions that would have been applied for the missing transmitter/receiver combinations. Thus, a step of correcting a taper function of receiver/transmitter tiles is applied when estimating radar data associated with a first transmitter/receiver combination by using radar data associated with a second transmitter/receiver combination.

It is noted that in the case of uniform tapers, the transmitted signals transmitted by the second, third and fourth transmitter modules are equal during the process of obtaining additional measurement data. Therefore, a single additional measurement step (repair step) is sufficient to obtain the data for construction of the missing data.

In this regard it is further noted that the application of a taper function is a scalar weighting function. Therefore, the product of the transmitter weighting function with the receiver weighting function can be modified as long as the product remains the same. As an example, the transmitter weighting function and the receiver weighting function are allowed to interchange.

Figure 4:
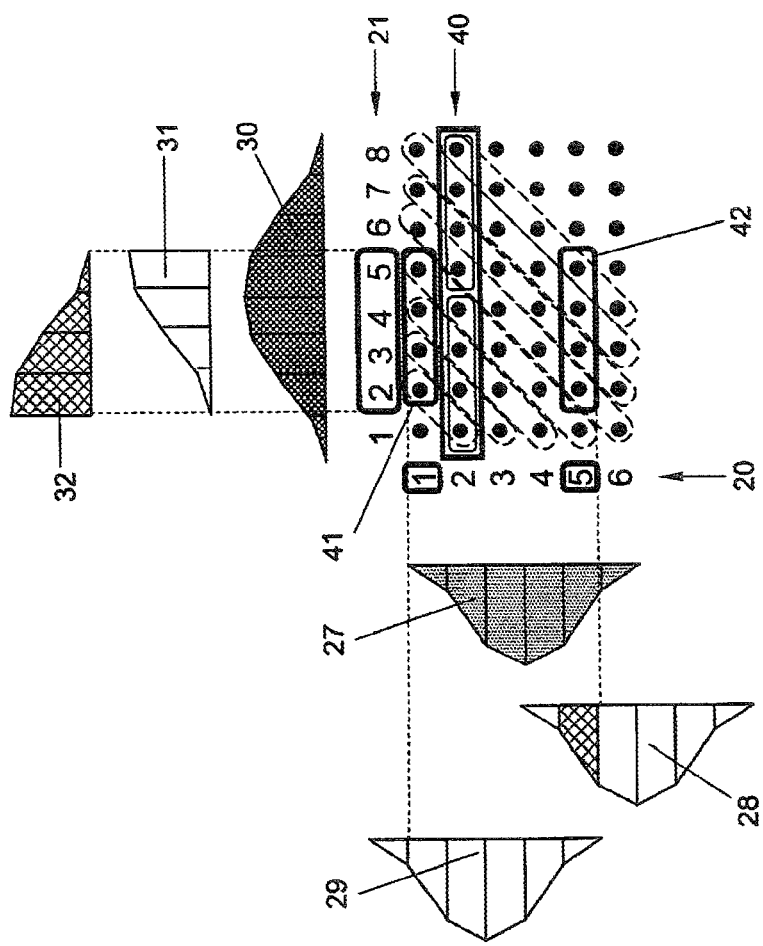
FIG. 4 shows a second schematic representation of measurements performed by a phased array radar system according to the invention.

FIG. 4 shows a second schematic representation of measurements performed by a phased array radar system 1 according to the invention. Here, the second transmitter module fails, so that a horizontal measurement data block 40 has to be constructed using additional data. As an example, the data can be constructed using data of a first block of data associated with the first transmitter module and the second, third, fourth and fifth receiver module, and data of a second block of data associated with the fifth transmitter module and the second, third, fourth and fifth receiver module. Again, two additional measurement steps are needed.

The applied method is in principle also applicable in case a transmitter module is failing or in case a transmitter module and a receiver module are failing. Also, the method can be applied in case of a multiple number of failing transmitter modules and or receiver modules.

After constructing the missing measurement data, the desired data can be obtained by adding the constructed missing data to the regularly obtained data.

Preferably, the system according to the invention is arranged for performing the steps of:
  simultaneously transmitting, at the transmitter tiles, a sequence of radar signals that are mutually orthogonal or linearly independent in the aperture domain;
  receiving radar data at receiver tiles;
  determining radar data associated with a single or a combination of a particular transmitter tile and a single or a combination of particular receiver tiles, from a sequence of radar data received at the particular receiver tile by using the orthogonality or linear dependence of the transmitted radar signal; and
  determining also radar data associated with the identified transmitter/receiver combination by using the orthogonality or linear dependence of the transmitted radar signal.

By transmitting a sequence of radar signals that are mutually orthogonal or linearly independent in the aperture domain, the orthogonality principle can advantageously be applied in determining radar data associated with the identified transmitter/receiver combination. As an example, when three beams are linearly dependent, only two coded transmission are needed.

Further, the system may be arranged to perform the steps of:
  determining a sequence of aperture codes of transmission signals that will allow reconstruction of missing virtual transceiver signals;
  determining beams and corresponding tapering weights of these beams for forming a reconstruction of missing virtual transceiver signals;
  transmitting the aperture coded sequence of radar signals;
  receiving a sequence of reflected signals at each tile with the predetermined beams and beam weights;
  reconstructing a total signal of missing virtual transceivers from the sequence of received aperture coded signals by exploiting the coding properties; and
  adding the reconstructed total missing signal to an uncorrected radar signal.

By applying a sequence of aperture codes, the full aperture can be exploited during transmission which is advantageous from an energetic point of view to avoid efficiency loss. As an example, the aperture code may include a time division multiplex (TDM) transform, a frequency division multiplex (FDM) transform and/or a code division multiplex (CDM) transform.

A TDM coding is simple to implement and to design in hardware. Further, FDM coding allows simultaneous transmission of repair beams, but requires then a multiple number of receivers per receiving module. When using CDM, all repair beams can be added by orthogonal sequences, e.g. using a Fourier decomposition or a Hadamard decomposition. Further, at each transmission a full aperture usage applies. When combining coding algorithms, advantages may add up. As an example, when using both FDM and CDM coding, a full aperture usage is applied and, in principle, all repair beams can be transmitted simultaneously.

Figure 5B:
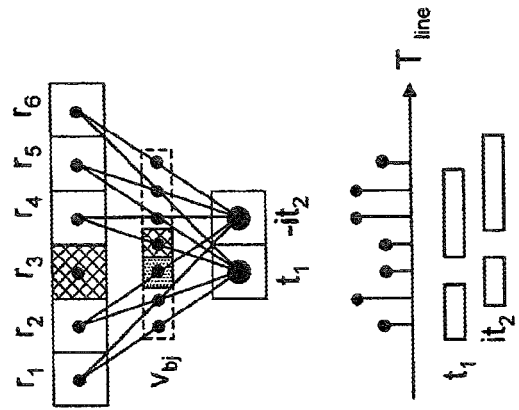
FIG. 5b shows a schematic view of the phased array radar system of FIG. 1a in another second specific acquisition step.
Figure 5A:
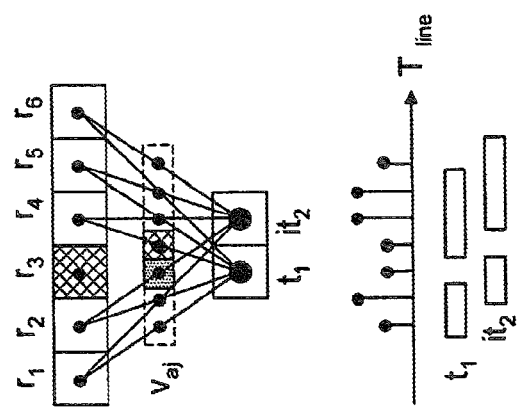
FIG. 5a shows a schematic view of the phased array radar system of FIG. 1a in another first specific acquisition step.

FIGS. 5$a$ and 5$b$ show schematic views of the phased array radar system shown in FIG. 2$a$, but in another first and second specific acquisition step. Here, separable signals are transmitted simultaneously by the transmitter modules t. By exploiting the orthogonal properties of the transmitted signals, the data of the virtual transceiver module, also called the virtual element signal, can be determined. In formulas, the virtual element signal is denoted $v_{ij} = t_j \times r_j$ wherein $v_{aj} = t_a \times r_j = (t_1 + it_2) \times r_j$ $v_{bj} = t_b \times r_j = (t_1 - it_2) \times r_j$ so that $\Rightarrow v_{1j} = (v_{aj} + v_{bj})/2$ $\Rightarrow v_{2j} = (-iv_{aj} + iv_{bj})/2.$ by In order to compensate for failure of a transmitter module $R_a$, the following algorithm can be adopted:
  Transmit $T_a = T_1 + iT_2$ and receive $R_1 \ldots R_6$
    Normal Taper $A_1 \ldots A_6$ for receive tile $R_1 \ldots R_6$
    Extra beam output with Taper $A_n$ for receive tiles $R_{n-1}$ and $R_{n+1}$
  Transmit $T_b = T_1 - iT_2$ and receive $R_1 \ldots R_6$
    Normal Taper $A_1 \ldots A_6$ for receive tile $R_1 \ldots R_6$
    Extra beam output with Taper $A_n$ for receive tiles $R_{n-1}$ and $R_{n+1}$
  Reconstruct $v_{ij} = T_i R_j$
    $T_1 R_j = (T_a R_j + T_b R_j)/2$; $j \neq n$
    $T_2 R_j = (-iT_a R_j + iT_b R_j)/2$; $j \neq n$
    $T_1 R_n = T_2 R_{n-1}$, using the $R_x$ beam of tile n−1 with taper $A_n$
    $T_2 R_n = T_1 R_{n+1}$, using the $R_x$ beam of tile n+1 with taper $A_n$
  Make the final beam
    $TR = (T_1 + T_2)(\Sigma R_i) = T_1 R_1 + \ldots + T_1 R_6 + T_2 R_1 + \ldots + T_2 R_n + \ldots + T_2 R_6$ As such, the applied method includes the steps of simultaneously transmitting, at the transmitter modules, radar signals that are mutually orthogonal in the aperture domain, receiving radar data at transmitter modules, determining radar data associated with a combination of a particular transmitter module and a particular receiver module, from radar data received at the particular receiver module by using the orthogonality of the transmitted radar signal, and determining also radar data associated with the identified transmitter/receiver combination by using the orthogonality of the transmitted radar signal.

Figure 7:
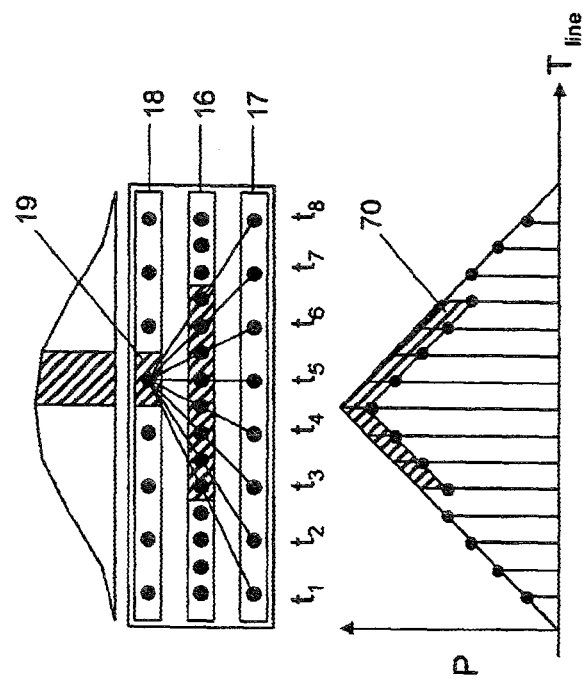
FIG. 7 shows a schematic view of a second phased array radar system according to the invention wherein a receiver module is defect.
Figure 6:
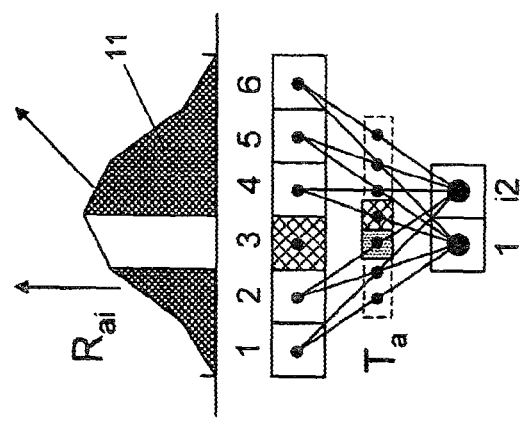
FIG. 6 shows a schematic taper function.

FIG. 6 shows a schematic taper function 11 that is applied to data received at the individual transceiver modules 3 to construct an ideal phased array signal. In order to simulate also the correct taper function, the algorithm includes the step of correcting a taper function of receiver modules when estimating radar data associated with a first transmitter/receiver combination by using radar data associated with second transmitter/receiver combination. A typical algorithm wherein low receiver side lobes are maintained could read as $T_a = T_1 + iT_2$
  receive $R_{a1} \ldots R_{a6}$
  Receive $R_{n-1}$ and $R_{n+1}$ with $R_n$ taper
$T_b = T_1 - iT_2$
  receive $R_{b1} \ldots R_{b6}$
  Receive $R_{b,n-1}$ and $R_{b,n+1}$ with $R_n$ taper Reconstruct $v_{ij}=T_iR_j$
$T_1R_j, T_2R_j$:
  Add $T_a$ and $T_b$
$T_1R_n, T_2R_n$:
  add neighbouring $R_x$
Make the final beam
  $TR = \Sigma T_1R_i + \Sigma T_2R_i$ In the above-described embodiments, the number of transmitter modules is two. FIG. 7 shows a schematic view of a second phased array radar system according to the invention having a full array 17 of transmitter modules $t_1$-$t_8$. Again, a receiver module 19 in a full receiver array 18 is defect. Further, an virtual array 16 of virtual transceiver modules is defined to express the typical MIMO structure. The lower part of FIG. 5 shows the transmitter receiver sampling population P along the transmission line $T_{line}$ in relation to the corresponding virtual transceiver modules. A lowered part 70 of the sampling population P curve illustrates the loss in data at the receiver module 19.

Figure 8:
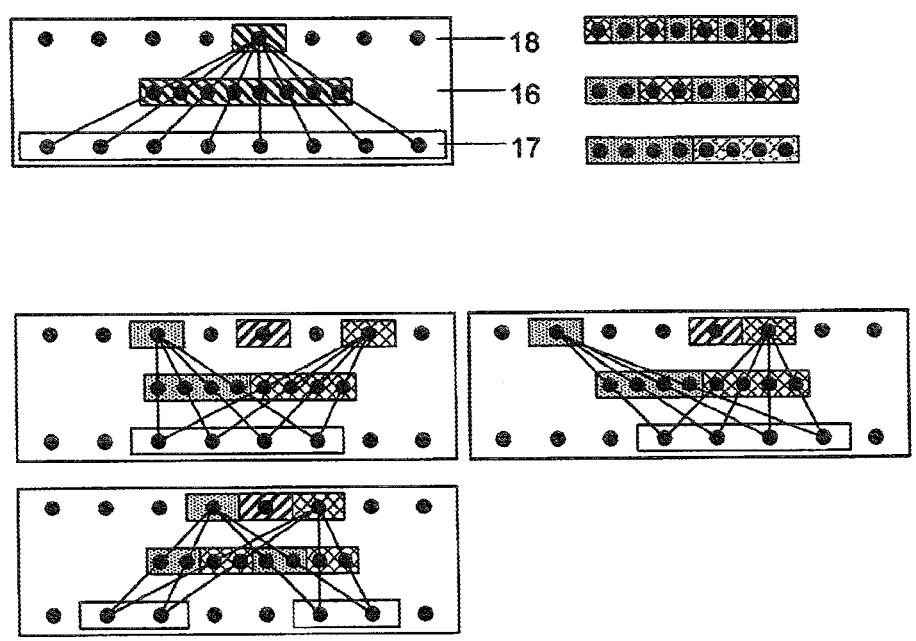
FIG. 8 shows a first schematic view of transmitter/receiver combinations.

FIG. 8 shows a first schematic view of transmitter/receiver combinations. A first pattern at the top on the left of FIG. 8 indicates the lost transmitter/receiver TR positions. As a second step, the TR positions are split in two equiform parts that fill up each other after a shift. Then, virtual transceiver module solutions are constructed producing the fill-in TR area as shown in the lower three patterns of FIG. 8. As a constraint no Rx is allowed on the failing module and all Rx and Tx modules related to the virtual transceiver modules should be within the array size.

Figure 9:
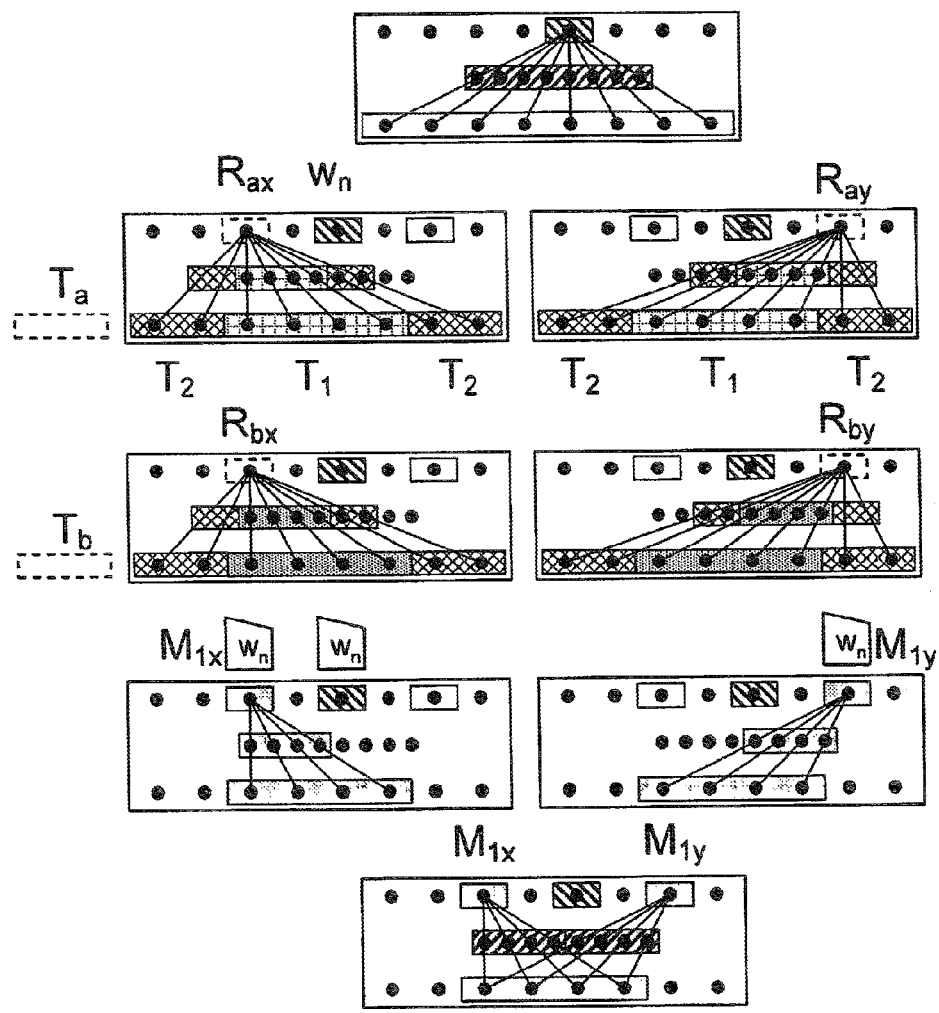
FIG. 9 shows a second schematic view of transmitter/receiver combinations.

A realization of a full aperture transmit power could be implemented by the algorithm:
Transmit and measure
  $T_a \rightarrow R_{ax}$ and $R_{ay}$
  $T_b \rightarrow R_{bx}$ and $R_{by}$
Apply failure window
  $M_{ax,y} = w_n R_{ax,y}$
  $M_{bx,y} = w_n R_{bx,y}$
Calculate lost array halves
  $M_{1x} = M_{ax} + iM_{bx}$
  $M_{1y} = M_{ay} + iM_{by}$
  $M_2$ is removed
Sum the two halves
  $M_{lost} = M_{1x} + M_{1y}$
Add $M_{lost}$ to the perturbed beam result Here, FIG. 9 shows a second schematic view of transmitter/receiver combinations illustrating the used terminology.

The applied method is in principle also applicable in case a transmitter module is failing.

Figure 10:
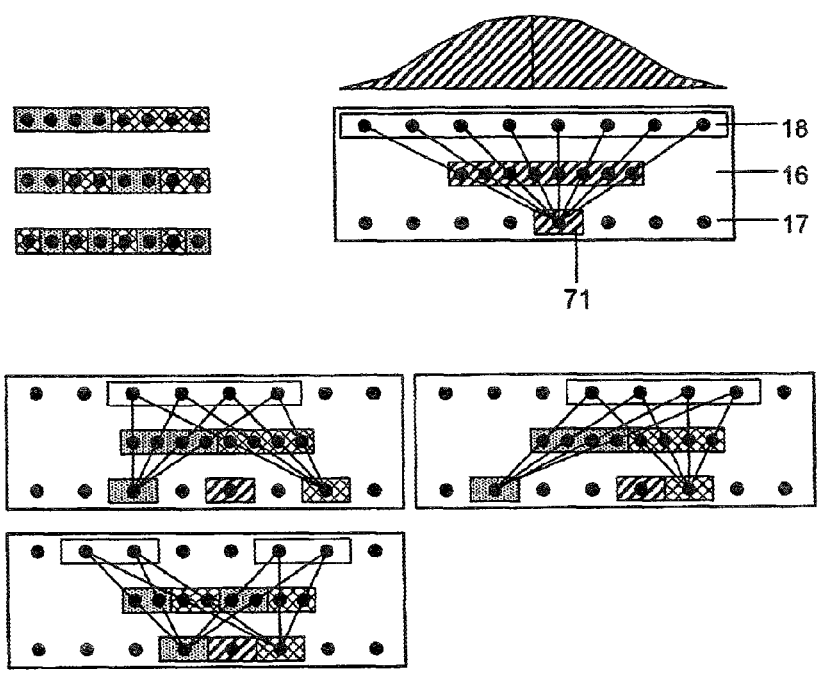
FIG. 10 shows a third schematic view of transmitter/receiver combinations in view of the phased array radar system of FIG. 7 wherein a transmitter module is defect.

FIG. 10 shows a third schematic view of transmitter/receiver combinations in view of the phased array radar system including a full transmitter array 17 and a full receiver array 18 wherein a transmitter module 71 is defect. In the upper right pattern, the lost TR positions are determined. Again the Tr positions are split in 2 equiform parts that fill up each other after applying a shift, see upper left pattern in FIG. 10. The transmitter modules associated with the virtual transceiver modules are mutually orthogonal. Here, three taper functions can be applied at the receiver modules associated with the virtual transceiver modules. Here, a Tx taper can be incorporated in the left and right half beam taper.

Figure 11:
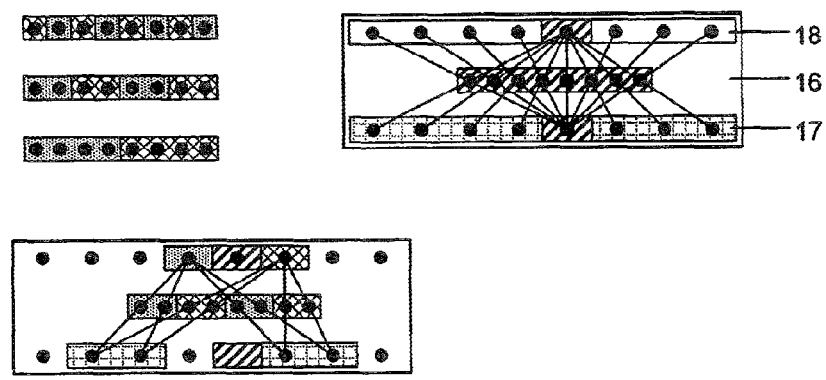
FIG. 11 shows a fourth schematic view of transmitter/receiver combinations in view of the phased array radar system of FIG. 7 wherein a transmitter module is defect.

FIG. 11 shows a fourth schematic view of transmitter/receiver combinations in view of the phased array radar system having full receiver and transmitter arrays 18, 17 wherein both a receiver module and a transmitter module are defect. A similar strategy can be applied of determining lost TR positions, see upper right pattern, splitting the TR positions in 2 equiform parts that fill up each other after a shift, see upper left pattern, and locating the corresponding Tx array associated with the virtual transceiver module or MIMO, outside the failing module, see lower pattern in FIG. 11.

Figure 12:
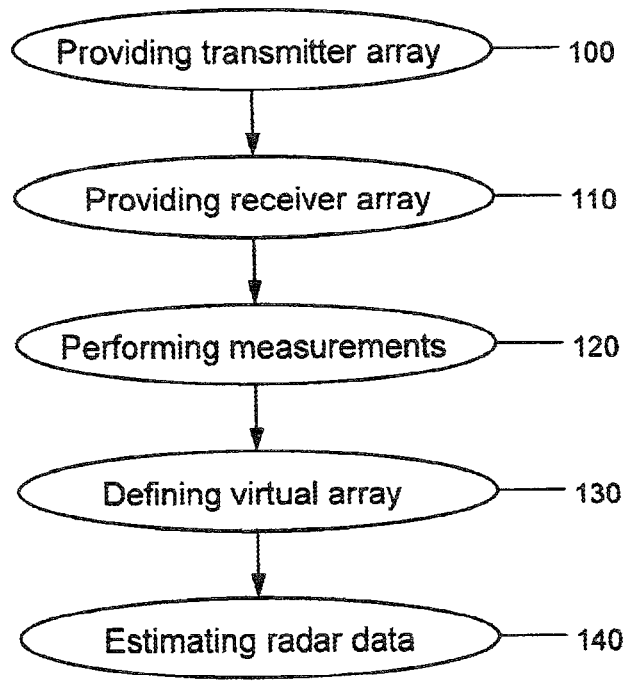
FIG. 12 shows a flow chart of an embodiment of a method according to the invention.

FIG. 12 shows a flow chart of an embodiment of the method according to the invention. A method is used for compensating sub-array or element failure in a phased array radar system. The method comprises a step of providing (100) a transmitter array comprising a multiple number of substantially identical transmitter tiles arranged at equidistant positions on a linear transmitting line, a step of providing (110) a receiver array comprising a multiple number of substantially identical receiving tiles arranged at equidistant positions on a linear receiving line, wherein the distance between adjacent transmitting tiles substantially equals the distance between adjacent receiving tiles and wherein the linear transmitting line is substantially parallel to the linear receiving line, a step of performing (120) phased array radar measurements, a step of defining (130) virtual array comprising a multiple number of virtual transceiver tiles arranged halfway all connection lines interconnecting a transmitter tile to a receiver tile, and a step of estimating (140) radar data associated with a first transmitter/receiver combination by using radar data associated with a second transmitter/receiver combination, wherein the virtual transceiver tile of the first transmitter/receiver combination substantially coincides with the virtual transceiver tile of the second transmitter/receiver combination.

The method of compensating sub-array failure in a phased array radar system can be performed using dedicated hardware structures, such as FPGA and/or ASIC components. Otherwise, the method can also at least partially be performed using a computer program product comprising instructions for causing a processor of the computer system to perform the above described steps of the method according to the invention. All processing steps can in principle be performed on a single processor. However it is noted that at least one step can be performed on a separate processor, e.g. the step of estimating radar data associated with a first transmitter/receiver combination by using radar data associated with a second transmitter/receiver combination, having a coinciding transmitter/receiver combination.

Figure 13:
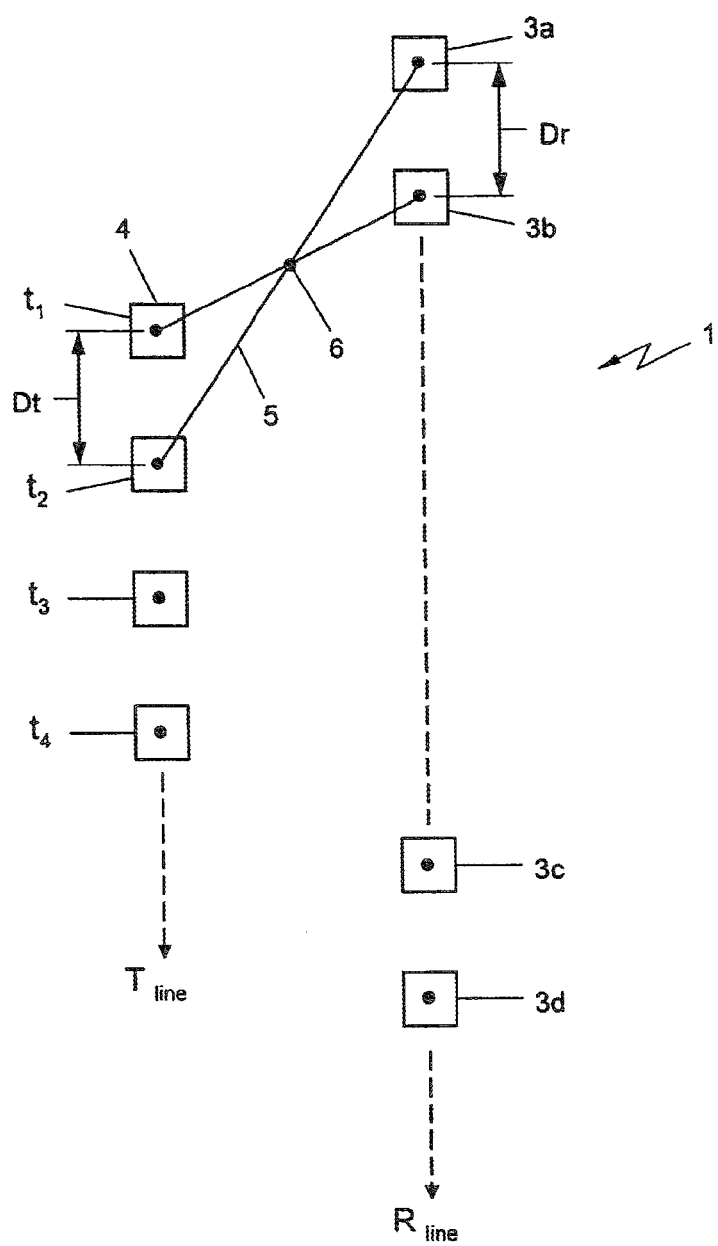
FIG. 13 shows a schematic view of a third phased array radar system according to the invention.

FIG. 13 shows a schematic view of a third phased array radar system 1 according to the invention. Here, four transmitter tiles $t_{1-4}$ are arranged at equidistant positions on a linear transmitting line $T_{line}$. The intermediate distance between subsequent transmitter tiles is distance $D_t$. The system 1 further includes four receiver tiles $3_{a-d}$ located on a linear receiving line $R_{line}$. The receiver tiles are grouped in two pairs having a mutual offset that is greater than the intermediate distance $D_r$ between the tiles in the same pair. The intermediate distances Dt and Dr are substantially equal, so that virtual transceiver modules 6 may coincide.

It is noted that the intermediate distance between subsequent receivers can be chosen different from the intermediate distance between subsequent transmitters. As an example, the intermediate distance $D_r$ between subsequent receivers can be chosen to be an integer number times greater than the intermediate distance $D_t$ between subsequent transmitters. Further, in principle, instead of arranging the transmitters and/or the receivers on a linear line, the tiles can be located on another line, e.g. a curved line. Then, the ratio between intermediate distances of receivers and transmitters, respectively, need not be an integer number. Also, it is not necessary that a transmission line is substantially parallel to a receiving line. As an example, the transmission line and the receiving line may intersect at a constant angle. However, in order to apply the invention, at least a number of virtual transmitter tiles coincide.

In the above described radar systems, the virtual transceiver modules are arranged halfway connection lines interconnecting a transmitter tile to a receiver tile. Then, the system is arranged for imaging radar objects in the so-called far field.

Figure 14:
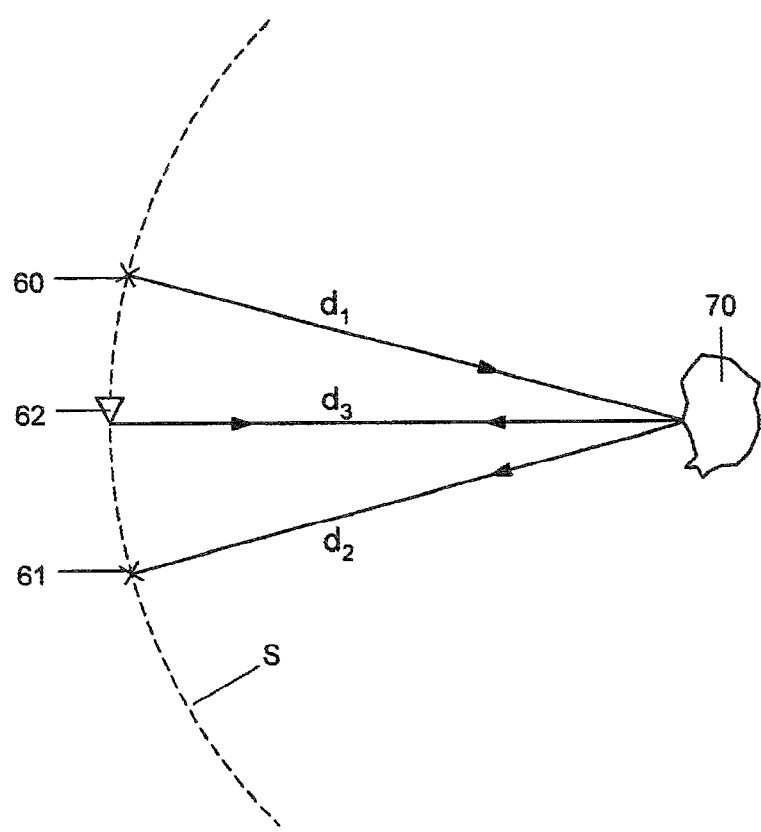
FIG. 14 shows a schematic view of a transmitter tile, a receiver tile and a corresponding virtual transceiver tile.

FIG. 14 shows a configuration of a transmitter tile 60, a receiver tile 61 and a corresponding virtual transceiver tile 62. The virtual transceiver tile 62 can, more generally, be defined by locating it such that the propagation time of a radar wave transmitted by the transmitter tile 60 and received by the receiver tile 61, via a radar object 70, substantially equals the propagation time of a radar wave transmitted and received by the virtual transceiver tile 62, via the radar object 70. The radar wave path length $d_1$ between the transmitter tile 60 and the radar object 70 added to the radar wave path length $d_2$ between the radar object 70 and the receiver tile 61 substantially equals two times the radar wave path length $d_3$ between the virtual transceiver tile 62 and the object 70. When the propagation medium is inhomogeneous, the radar wave path length may differ from geometrical distances between tiles and radar object.

Generally, the virtual transceiver tile 62 can be located on a sphere S. In order to make the definition of the virtual transceiver tile 62 unique, the virtual transceiver tile 62 is e.g. positioned such that the distance between the transmitter and the transceiver is equal to the distance between the receiver and the transceiver, and the distance between the transmitter and the transceiver is minimized. In the case that the radar object 70 is sufficiently far removed from the transmitter tile 60 and receiver tile 61, the virtual transceiver tile 62 will be located halfway the connection line interconnecting the transmitter 60 and the receiver 61. Alternatively, if the radar object 70 is more close, the radar system 1 is arranged for imaging a near field radar object.

The invention is not restricted to the embodiments described herein. It will be understood that many variants are possible.

Other such variants will be apparent for the person skilled in the art and are considered to fall within the scope of the invention as defined in the following claims.

The invention claimed is:

1. A method of compensating sub-array or element failure in a phased array radar system, comprising the steps of:
providing a transmitter array comprising a multiple number of substantially identical transmitter tiles;
providing a receiver array comprising a multiple number of substantially identical receiving tiles;
performing phased array radar measurements to obtain radar data associated with combinations of transmitter tiles and corresponding receiving tiles;
defining a virtual array comprising a multiple number of virtual transceiver tiles, each virtual transceiver tile corresponding to a particular transmitter tile and a particular receiver tile such that the propagation time of a radar wave transmitted by said transmitter tile and received by said receiver tile, via a radar object, substantially equals the propagation time of a radar wave transmitted and received by the virtual transceiver tile, via the radar object;
estimating radar data associated with a defective first combination of transmitter and receiver tiles by using radar data associated with a second combination of transmitter and receiver tiles, wherein the virtual transceiver tile of the first combination of transmitter and receiver substantially coincides with the virtual transceiver tile of the second combination of transmitter and receiver tiles; and
correcting the radar measurements by adding the estimated radar data of the defective first combination of transmitter and receiver tiles to the total radar response.

2. A method according to claim 1, further comprising the step of estimating radar data associated with transmitter receiver combinations related to a single transmitter and/or a single receiver.

3. A method according to claim 2, further comprising the step of identifying other transmitter/receiver combinations having their virtual transceiver tiles in common with the virtual transceiver tiles corresponding with the transmitter/receiver combinations associated with radar data to be estimated.

4. A method according to claim 3, further comprising the step of performing at least one additional measurement to obtain radar data associated with the identified other transmitter/receiver combinations.

5. A method according to claim 1, further comprising the steps of:
simultaneously transmitting, at the transmitter tiles, a sequence of radar signals that are mutually orthogonal or linearly independent in the aperture domain;
receiving radar data at receiver tiles;
determining radar data associated with a single or a combination of a particular transmitter tile and a single or a combination of particular receiver tiles, from a sequence of radar data received at the particular receiver tile by using the orthogonality or linear dependence of the transmitted radar signal; and
using the orthogonality or linear dependence of the transmitted radar signal to determine radar data associated with the identified transmitter/receiver combination.

6. A method according to claim 1, including the steps of:
determining beams and corresponding tapering weights of these beams for forming a reconstruction of missing virtual transceiver signals;
transmitting an aperture coded sequence of radar signals;
receiving a sequence of reflected signals at each tile with the predetermined beams and beam weights;
reconstructing a total signal of missing virtual transceivers from the sequence of received aperture coded signals by exploiting the coding properties; and
adding the reconstructed total missing signal to an uncorrected radar signal.

7. A method according to claim 6, wherein the coding properties include orthogonality or linear independence, and/or wherein the coding includes a time division multiplex transform, a frequency division multiplex transform and/or a code division multiplex transform.

8. A method according to claim 1, wherein a virtual transceiver tile is defined halfway all connection lines interconnecting a transmitter tile to a receiver tile.

9. A method according to claim 1, comprising the step of correcting a taper function of receiver tiles and/or transmitter tiles when estimating radar data associated with a first transmitter/receiver combination by using radar data associated with a second transmitter/receiver combination.

10. A method according to claim 1, wherein radar data is estimated when a radar measurement associated with a transmitter/receiver combination is not available.

11. A method according to claim 10, wherein radar measurements associated with a particular transmitter tile and/or a particular receiver tile are not available.

12. A method according to claim 1, wherein the number of transmitter tiles is two or more than two.

13. A method according to claim 1, wherein the transmitter tiles are arranged at equidistant positions on a linear transmitting line, and wherein the receiving tiles are arranged at equidistant positions on a linear receiving line, wherein the distance between adjacent transmitting tiles substantially equals the distance between adjacent receiving tiles and wherein the linear transmitting line is substantially parallel to the linear receiving line.

14. A phased array radar system, comprising:
- a transmitter array comprising a multiple number of substantially identical transmitter tiles;
- a receiver array comprising a multiple number of substantially identical receiving tiles; and
- a processor for processing phased array radar measurements to obtain radar data associated with combinations of transmitter tiles and corresponding receiving tiles, wherein the processor is arranged for performing the steps of:
- defining a virtual array comprising a multiple number of virtual transceiver tiles, each virtual transceiver tile corresponding to a particular transmitter tile and a particular receiver tile such that the propagation time of a radar wave transmitted by said transmitter tile and received by said receiver tile, via a radar object, substantially equals the propagation time of a radar wave transmitted and received by the virtual transceiver tile, via the radar object;
- estimating radar data associated with a defective first combination of transmitter and receiver tiles by using radar data associated with a second combination of transmitter and receiver tiles, wherein the virtual transceiver tile of the first combination of transmitter and receiver substantially coincides with the virtual transceiver tile of the second combination of transmitter and receiver tiles; and
- correcting the radar measurements by adding the estimated radar data of the defective first combination of transmitter and receiver tiles to the total radar response.

15. A non-transitory computer readable medium having a computer program embodied thereon for compensating sub-array or element failure in a phased array radar system, which computer program comprises instructions for causing a processor to perform the step of processing phased array radar measurements obtained by means of:
- a transmitter array comprising a multiple number of substantially identical transmitter tiles; and
- a receiver array comprising a multiple number of substantially identical receiving tiles, wherein the step of processing including the steps of:
- defining a virtual array comprising a multiple number of virtual transceiver tiles, each virtual transceiver tile corresponding to a particular transmitter tile and a particular receiver tile such that the propagation time of a radar wave transmitted by said transmitter tile and received by said receiver tile, via a radar object, substantially equals the propagation time of a radar wave transmitted and received by the virtual transceiver tile, via the radar object;
- estimating radar data associated with a defective first combination of transmitter and receiver tiles by using radar data associated with a second combination of transmitter and receiver tiles, wherein the virtual transceiver tile of the first combination of transmitter and receiver substantially coincides with the virtual transceiver tile of the second combination of transmitter and receiver tiles; and
- correcting the radar measurements by adding the estimated radar data of the defective first combination of transmitter and receiver tiles to the total radar response.

* * * * *